Feb. 13, 1962 R. B. HANER ET AL 3,021,506

COMMUNICATION SYSTEM

Filed March 25, 1957 3 Sheets-Sheet 1

INVENTORS
R. B. HANER AND
H. C. SIBLEY
BY Forest B. Hitchcock
THEIR ATTORNEY

Feb. 13, 1962 R. B. HANER ET AL 3,021,506

COMMUNICATION SYSTEM

Filed March 25, 1957 3 Sheets-Sheet 2

INVENTORS
R.B. HANER AND
H.C. SIBLEY

BY Forest B. Hitchcock

THEIR ATTORNEY

INVENTORS
R.B. HANER AND
H.C. SIBLEY
BY Forest B. Hitchcock
THEIR ATTORNEY

United States Patent Office 3,021,506
Patented Feb. 13, 1962

3,021,506
COMMUNICATION SYSTEM

Robert B. Haner, Scottsville, and Henry C. Sibley, Spencerport, N.Y., assignors to General Railway Signal Company, Rochester, N.Y.

Filed Mar. 25, 1957, Ser. No. 648,189
5 Claims. (Cl. 340—147)

This invention relates to a system of electronic code communication and more particularly pertains to a transistor indication system for transferring information over a pair of line wires from each of a number of remote locations to a single receiving location.

The communication system of this invention is of particular advantage in railway signaling systems, especially in a system of centralized traffic control (C.T.C.). In such a system, controls for the switches, signals, and other devices at each of a number of field stations are transmitted to each field station from a central office. In addition, each field station includes apparatus for transmitting to the central office indications that provide information as to the actual operated conditions of the various devices at a field location.

Under some circumstances, the field stations are spaced at rather considerable intervals so that there may be a number of track sections between successive field stations. It is then desirable to provide apparatus that will permit the track occupancy conditions of these intervening track sections to be reported continuously to the nearest field station from which this information can be relayed over the centralized traffic control system to the central office. Provided that the reporting of track occupancy conditions to the nearest field station can be accomplished in a reliable and economical manner, an arrangement of this kind is naturally of considerable advantage as compared to providing an extra field station for each location where track occupancy conditions are desired to be known.

One difficulty in providing such an indication reporting system results from the absence of a suitable source of energy for powering a transmitting device of some sort at a remote trackway location. This makes it impossible to use the usual type of transmitter having electron tubes because it is not practical to supply over line wires the relatively large amount of high voltage power such a device requires. It is also required that the system permit the transmission of indications to the field station from a relatively large number of remote track locations without introducing considerable complexity and cost.

These requirements of an indication reporting system are believed to be advantageously accomplished by the system of the present invention. In a general manner, it may be said that communication is provided between the field station and each of the various trackway locations over a single pair of line wires. At each of the wayside locations is a transistorized transmitter which is not required to be provided with any local source of power; energy for operating the transmitter at each location is provided by the field station over the line wires. Each transmitter operates on its presassigned frequency, and a corresponding receiver tuned to that frequency is provided at the field station. One embodiment of the invention disclosed herewith illustrates how the effective capacity of the system is doubled by making it possible for two different indications to be transmitted by the single transmitter at a location, thereby considerably increasing the facility of the system on a two-track stretch of railroad where it would ordinarily be desirable to transmit, from a single location, the track occupancy condition of each of the two tracks.

Although the communication system of this invention is more particularly disclosed with respect to the reporting of track occupancy conditions to a C.T.C. field station, the invention is not intended in any way to be limited to such usage. It may equally well be used in other ways as, for example, in the reporting to a central location of the presence or absence of goods at selected remote locations in a conveyor system.

It is, accordingly, an object of this invention to provide an indication reporting system for railroads that does not require any local source of energy at a remote indication reporting location.

Another object of this invention is to provide an indication transmitting system wherein each transmitting device at the respective remote locations receives its energy only over a pair of line wires connecting it to the indication receiving location.

An additional object of this invention is to provide an indication transmitting system comprising a transistor transmitter at each remote location receiving its only energization over a pair of line wires connecting that location to the indication receiving location.

An additional object of this invention is to provide an indication transmitting system comprising a carrier transmitter at each remote location operating on an assigned frequency and yet permitting the transmission of two different indications concurrently to the central indication receiving location.

Other objects, purposes, and characteristic features of this invention will in part be obvious from the accompanying drawings and in part pointed out as the description of the invention progresses.

In describing this invention in detail, reference will be made to the accompanying drawings in which like reference characters designate corresponding parts in the several views, and in which.

To simplify the illustration and facilitate in the explanation of this invention, the various parts and circuits are shown diagrammatically, and certain conventional illustrations have been used. The drawings have been made to make it easy to understand the principles and manner of operation rather than to illustrate the specific construction and arrangement of parts that would be used in practice. The symbols (+) and (−) indicate characters to the opposite terminals of a source of relatively low voltage suitable for the operation of the various transistors that are employed.

Figure 1:
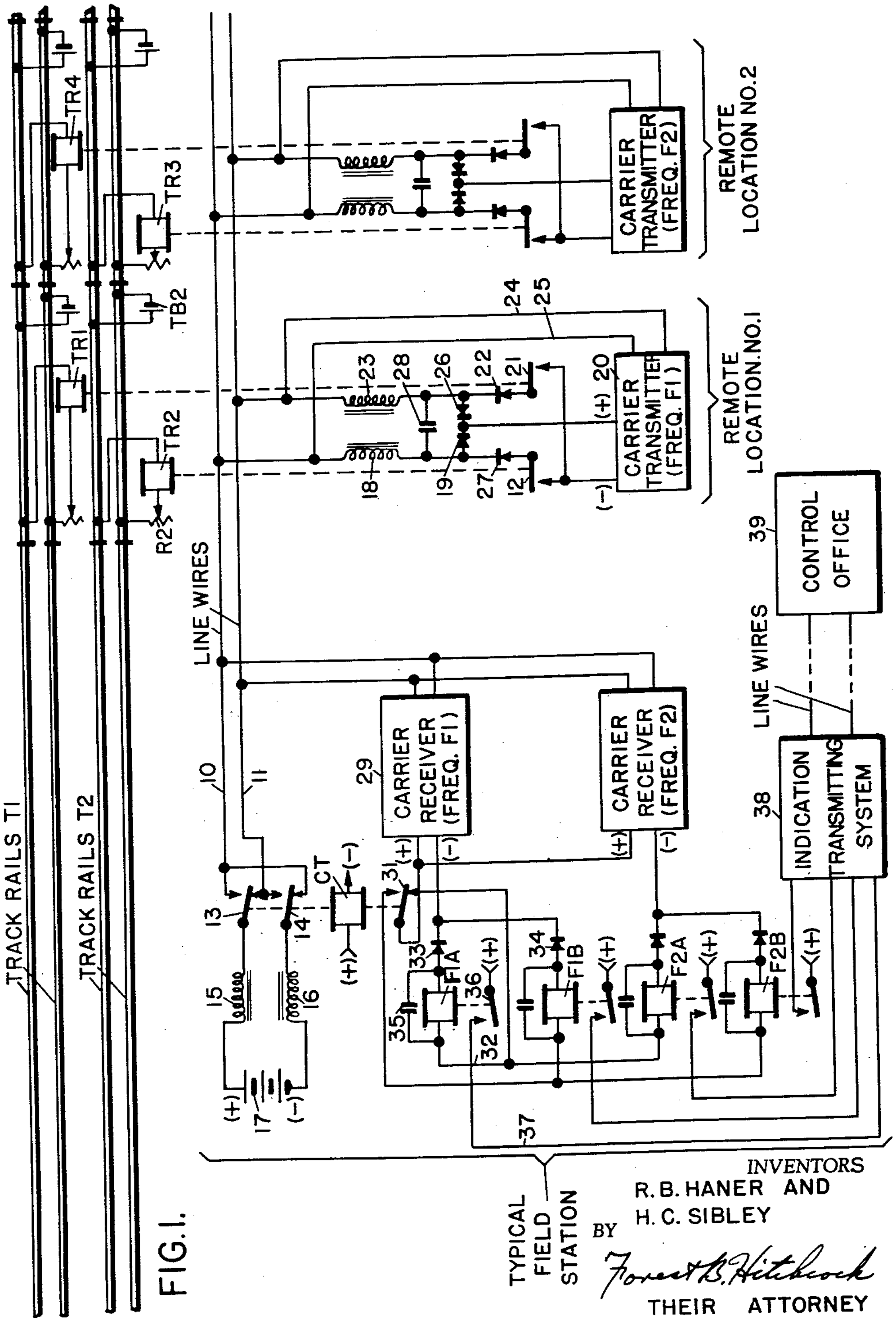
FIG. 1 illustrates in general form the general organization of this invention in one particular embodiment thereof.

As shown in FIG. 1, the line wires 10 and 11 connect the field station with each of the various remote wayside locations where track occupancy conditions are desired to be forwarded to the field station. As will become apparent, the embodiment of the invention shown in this FIG. 1 is particularly adapted to the reporting of two track occupancy conditions from a single location, and for this reason, two parallel stretches of track are illustrated designated T1 and T2, respectively. Each stretch of track is provided with a plurality of track sections having a track battery such as battery TB2 connected to the rails at the feed end thereof and with a track relay such as track relay TR2 connected across the track rails at the opposite end through a variable resistor R2. At the site of the remote location No. 1 there are thus the two track relays TR2 and TR1. Similarly, there are two track relays TR3 and TR4 at the respective relay ends of the two adjoining track sections at remote location No. 2.

Each track relay is normally energized by the energy supplied to it over the track rails from the associated track battery, but such relay is released when it is deprived of its normal operating energy as a result of the shunting effect of a train occupying the track section. Thus, the condition of occupancy or non-occupancy of any track section can effectively be reported back to the associated field station by transmitting information to such field station as to whether the associated contact of the track relay is opened or closed. It is necessary, therefore, to transmit one kind of signal to the associated field station when back contact 12 of track relay TR2 is opened, and another kind of indication when this back contact 12 is closed.

At the field station, an oscillatory device such as the code transmitting relay CT is provided. This code transmitter may be of any suitable type such as is well-known in the railway signaling art. The code transmitter CT is normally energized and in this condition is continually effective to operate its contacts 13, 14, and 31 alternately between their front and back positions at a predetermined rate. When contacts 13 and 14 are in the position shown in FIG. 1, line wire 10 is connected through back contact 14, and inductor 16 to the negative terminal of battery 17. At the same time, line wire 11 is connected through back contact 13, through inductor 15, to the (+) terminal of battery 17. Therefore, for the condition of code transmitter CT illustrated, line wire 10 is of negative polarity as compared to line wire 11. However, when these contacts 13 and 14 move to their opposite position, then the polarity of energy on the line wires 10 and 11 is reversed so that line wire 10 is then of positive polarity as compared to line wire 11.

At each remote location, one particular polarity of energization of line wires 10 and 11 will permit the energization of the carrier transmitter at that location provided only that the corresponding one of the two track relay contacts is closed; if it is open, the carrier transmitter remains inactive. Similarly, the opposite polarity of energization on wires 10 and 11 will also result in the transmitter being rendered active but only if the other track relay contact is then closed. More specifically, if wire 10 is positive with respect to wire 11, then the positive energization of wire 10 will be applied through the inductor winding 18, through rectifier 19, to the positive input terminal of the transmitter 20. If track relay TR1 is dropped away as a result of occupancy of the associated track section, then the negative input terminal of transmitter 20 will be connected through back contact 21 of track relay TR1, rectifier 22, and inductor 23, to the line wire 11 which is then at a negative potential. This energization of the input terminals of transmitter 20 with the proper polarity of energization causes the transmitter to provide a steady carrier wave of energy on its output wires 24 and 25 which connect to the line wires 10 and 11, respectively. The overall result, therefore, is that, with contact 21 closed, the carrier transmitter 20 will be rendered active whenever the line wires 10 and 11 are energized with a polarity causing line wire 10 to be positive with respect to line wire 11.

The line wires 10 and 11 are alternately energized with a polarity opposite to that described above so that wire 10 becomes negative with respect to wire 11. Under those conditions, positive wire 11 is connected through inductor 23 and rectifier 26 to the positive input terminal of transmitter 20. The negative input terminal is then connected through back contact 12 of track relay TR2 provided that this track relay is then dropped away, through rectifier 27, and inductor 18, to negative line wire 10. Thus, as before, the positive and negative input terminals of the carrier transmitter 20 are respectively connected to the positive and negative line wires, but this time the completion of the circuit to permit this energization is dependent upon the closure of back contact 12 rather than back contact 21.

In summary, therefore, it may be said that the transmitter 20 can be rendered active to supply its distinctive carrier frequency to line wires 10 and 11 in response to either polarity of energization of wires 10 and 11 but that it can do so in response to one polarity of energization only if contact 12 is closed and can do so in response to the other polarity of energization only if back contact 21 is closed.

The inductors 18 and 23 have the function of permitting the transmitter input terminals to be energized by the direct-current voltage appearing across the line wires 10 and 11 while at the same time establishing a high impedance with respect to the output frequency of the carrier transmitter at the point where connection is made to the line wires, thereby preventing a low impedance shunting effect of the transmitter output. They further act in cooperation with the capacitor 28 to limit the effect of any high voltage surges that may appear on line wires 10 and 11. Thus, the capacitor 28 connected between the lower terminals of inductors 18 and 23 has the effect of reducing the amplitude at that point of any large voltage surge that may appear across the line wires 10 and 11 as a result of some extraneous influence such as lightning, for example. The capacitor 28 will be charged by such voltage surge and thereby prevent the voltage across any of the associated diodes from rising to an abnormally high value which would tend to damage them.

At the field station, a carrier receiver is provided to correspond to each carrier transmitter. A carrier receiver 29 is thus provided corresponding to the transmitter 20, and this receiver 29 will provide a direct-current output voltage across its output terminals only when the line wires 10 and 11 are energized with the particular frequency generated by transmitter 20. At any instant a plurality of transmitters may be simultaneously applying their different distinctive carrier frequencies to the line wires 10 and 11; however, each receiver at the field station is provided with tuned circuit means as will subsequently be described that permits it to provide an output signal only when the particular carrier frequency for which it is tuned is then being applied to the line wires.

From the description that has been given of the apparatus at a remote location, it is apparent that the mere reception by a carrier receiver of carrier wave energy from the corresponding transmitter does not by itself indicate which of the two contacts associated with that transmitter was closed and thus responsible for the transmission of that carrier frequency. To provide this detection, two electromagnetic relays are associated with each carrier receiver and these are selectively made responsive to the output of the receiver in accordance with the particular polarity of energization applied at any instant to the line wires 10 and 11. For example, whenever the code transmitter CT is in the condition where its back contacts are closed, then the positive output terminal of receiver 29 is connected through back contact 31 to wire 32, then through the winding of relay F1A and rectifier 33 to the negative output terminal of receiver 29. Thus, the energization of this relay F1A by carrier frequency F1 at a time when the back contacts of code transmitter CT are closed, i.e. when wire 11 is positive with respect to wire 10, means that back contact 12 of relay TR2 must be closed. If relay F1A does not receive any energization from receiver 29 when code transmitter CT has its back contacts closed, this is similarly indicative of the fact that back contact 12 at remote location No. 1 must be open.

Whenever the code transmitter CT is in the condition where its front contacts are closed, the positive output terminal of receiver 29 is then connected through front contact 31 of code transmitter CT, through the winding of relay F1B and through rectifier 34, back to the negative output terminal of receiver 29. This energization of relay F1B by carrier frequency F1 at a time when wire 10 is positive with respect to wire 11 means that, at remote location No. 1, back contact 21 of track relay TR1 must be closed.

As the code transmitter CT thus operates between its two opposite conditions, carrier energy may be selectively applied to the line wires from any one of the various carrier transmitters at the respective remote locations. Also, as the code transmitter operates alternately in this manner, the output terminals of each carrier receiver at the field station are connected alternately to the windings of the two relays associated with that particular receiver. Although each relay can be energized only momentarily by the associated receiver, it will, nevertheless, remain in its picked-up condition because of the capacitor shunting its winding. Thus, the capacitor 35 which is connected across the winding of relay F1A becomes charged during the interval that the relay winding is energized by the output of receiver 29. During the time that the contacts of the code transmitter CT are in their opposite condition so that the winding of relay F1A is disconnected from the output of receiver 29, the charged capacitor 35 discharges through the winding of relay F1A, thereby maintaining this relay in its picked up condition.

It will be readily apparent to anyone skilled in the art how the selectively actuated indication relays such as relay F1A may be utilized to provide an input to an indication transmitting system whereby the track occupancy conditions of the various track sections may be forwarded to the control office of a centralized traffic control system. This has been illustrated diagrammatically in FIG. 1 by indicating that the picking up of any indication relay results in the application of energy through the front contact of that relay to apparatus designated as an indication transmitting system 38. Thus, the picked-up condition of relay F1A permits energy to be applied from the (+) terminal, through front contact 36 of relay F1A, and over wire 37, to the indication transmitting system 38. This indication transmitting system 38 may be any of various kinds well-known in the art and thus will not be described in detail. It is sufficient to say that these track occupancy conditions, as well as the operated conditions of all the other devices associated with the field station, may then be transmitted over a pair of line wires to the control office 39.

Figure 2:
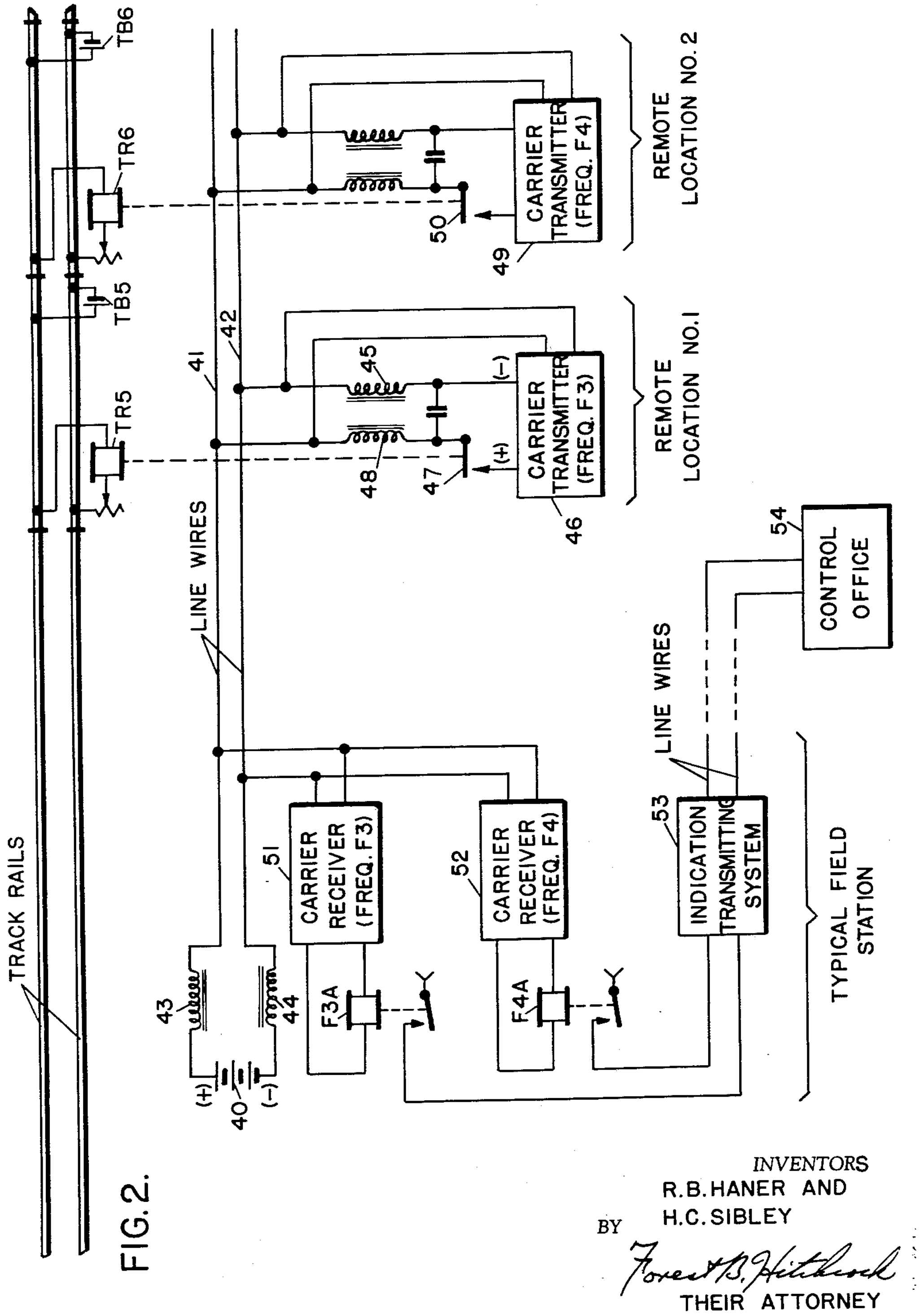
FIG. 2 illustrates in general form a modified and simplified form of the invention.

The modification of the invention shown in FIG. 2 is essentially a simplification of that shown in FIG. 1 and is particularly adapted for a situation where it is required that only one track occupancy indication be transmitted from each remote location to the field station. In this modification, the line wires are not alternately-pole changed with respect to the battery 40 but are instead continually energized with the same polarity of direct current.

The carrier transmitter at each remote location has its positive and negative input terminals connected, respectively, to the line wires 41 and 42. Line wire 41 is at all times connected through the inductor 43 to the (+) terminal of battery 40, and line wire 42 is similarly connected through the inductor 44 to the (−) terminal. The negative input terminal of the transmitter 46 is connected through the inductor winding 45 to line wire 42 at all times. The positive input terminal of this transmitter 46 can be connected to line wire 41 only if back contact 47 of track relay TR5 is closed as a result of occupancy of the associated track section. When back contact 47 is thus closed, the positive input terminal of transmitter 46 is connected through this closed back contact and through the winding of inductor 48 to the line wire 41. As long as the back contact 47 is closed, the carrier transmitter 46 is continually effective to apply its distinctive output frequency, designated F3, to the line wires 41 and 42. The carrier transmitter 49 is similarly rendered active to apply its distinctive output frequency F4 to the line wires provided only that back contact 50 of track relay TR6 is closed.

At the field station which receives these track occupancy indications, a carrier receiver is provided for each remote location transmitter. Thus, the receiver 51 which is tuned so as to provide an output signal when frequency F3 is applied to the line wires corresponds to the carrier transmitter 46 at remote location No. 1. The carrier receiver 52 similarly corresponds to the carrier transmitter 49 at remote location No. 2. Each carrier receiver supplies its direct-current output to the winding of an associated relay. In this way, receiver 51, for example, is effective to pick up relay F3A whenever it receives a carrier wave input of frequency F3.

In a manner similar to that described in connection with the embodiment of FIG. 1, the indication relays such as relays F3A and F4A are effective to provide distinctive inputs to an indication transmitting system 53 at the field station so that indications may be transmitted over the line wires to the control office 54.

Figure 3:
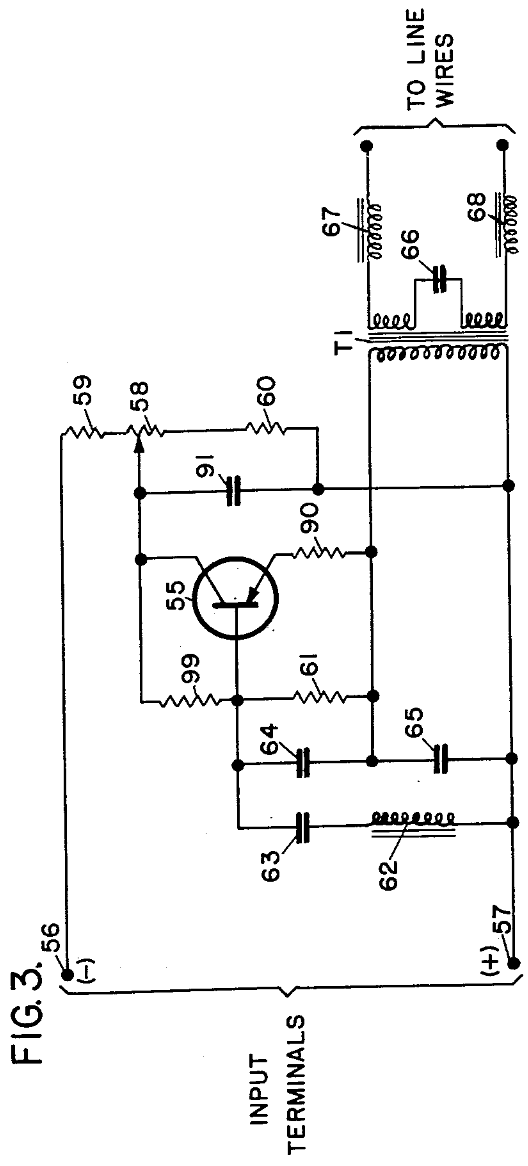
FIG. 3 illustrates the circuit organization of a typical transistor transmitter of the present invention.

FIG. 3 illustrates the circuit diagram of a carrier transmitters such as those shown in block diagram form in FIGS. 1 and 2. The transmitter comprises a single transistor 55 which oscillates at a predetermined frequency whenever its input terminals 56 and 57 receive direct-current energy of the proper polarity causing terminal 56 to be negative and terminal 57 to be positive.

Assuming that the input terminals are suitably energized with direct-current energy of the proper polarity and of sufficient amplitude, a suitable collector voltage to provide the desired output signal level is obtained by adjustment of the variable tap of potentiometer 58 which is connected in series with resistors 59 and 60 between the input terminals 56 and 57. The base is biased to provide temperature compensated operation by being connected to the junction of the voltage divider resistors 99 and 61. The emitter is biased by the flow of emitter current through resistor 90. Capacitor 91 has the function of filtering out undesired voltage surges from the voltage source that would otherwise appear at the collector. A tuned circuit is included in the emitter-base circuit, and this tuned circuit includes the inductor 62 which is connected in series with the tuning capacitor 63 and also includes the two series-connected capacitors 64 and 65 which shunt inductor 62 and capacitor 63. The oscillatory voltage present in this tuned circuit is transformer-coupled to the output terminals of this transmitter by connecting the primary winding of transformer T1 across the terminals of capacitor 65.

The two secondary windings of transformer T1 are connected in series through the tuning capacitor 66. The two remaining terminals of the two secondary windings are connected respectively through inductors 67 and 68 to the output terminals which are selectively connected to the line wires as previously described. The inductors 67 and 68, the capacitor 66, and the secondary winding of transformer T1 are tuned to series resonance for the transmitter's output frequency. The values of these various components are selected to present the desired impedance and band width characteristics at the desired frequency. The use of a series rather than parallel tuned output circuit causes the transmitter to present a high impedance to the line wires for frequencies other than the operating frequency, thereby minimizing the loading effect on the line wires when there are a large number of remote locations.

Figure 4:
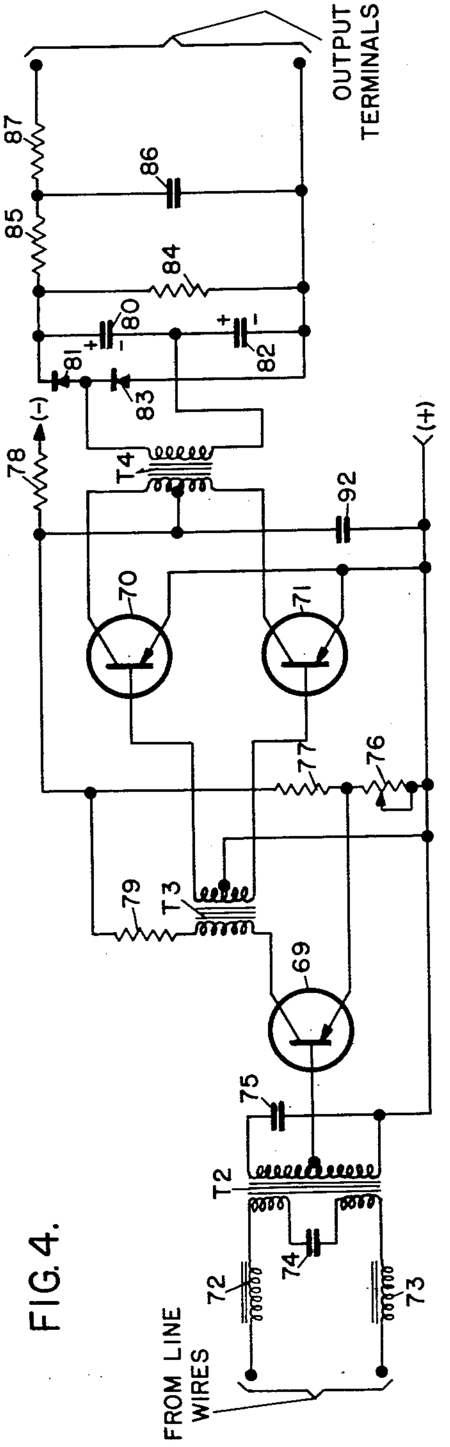
FIG. 4 illustrates the circuit organization of a typical carrier receiver of this invention.

The carrier receiver shown schematically in FIG. 4 comprises an input amplifier stage including transistor 69 and a double-ended output stage including the transistors 70 and 71. The carrier wave input obtained from the line wires is applied through the two inductors 72 and 73 respectively, to the input terminals of the two primary windings of transformer T2. These inductor windings also cooperate with the tuning capacitor 74 and the primary winding of transformer T2 to tune the input circuit of the receiver to the particular carrier frequency that the receiver is organized to respond to. The secondary of transformer T2 is shunted by another tuned capacitor 75 which similarly tunes the secondary winding to the desired input frequency.

The carrier wave signal appearing across the lower half of the secondary winding of transformer T2 is applied through the variable resistance provided by potentiometer 76 to the emitter-base junction of transistor 69. The emitter of this transistor is suitably biased by being connected to the junction of resistors 76 and 77 which, together with resistor 78 comprise a voltage divider connected between the (−) and (+) voltage terminals. A capacitor 92 is connected from the left-hand terminal of resistor 78 to (+) and acts as a filter to prevent spurious supply voltage variations from appearing at the collectors of the various transistors.

The oscillatory collector current of transistor 69 flows through the primary winding of transformer T3 and through resistor 79. This transformer T3 has the center tap of its secondary winding connected to (+). Since the emitters of both transistors 70 and 71 are connected to (+), both transistors are alternately made conductive as a result of the connection of their respective bases to the opposite terminals of the secondary winding.

A novel circuit organization is provided for the receiver of FIG. 4 to insure that substantially no output signal is obtained until the input signal has reached a predetermined threshold value; however, when this threshold value of input signal is reached, the receiver output then abruptly provides the full output signal. More specifically, with no input signal applied to the emitter-base junction of transistor 69, this transistor is cut off so that no input signal can be provided to the two transistors 70 and 71 by transformer coupling from the collector circuit of transistor 69 through the coupling transformer T3. The two transistors 70 and 71 are thus also substantially cut off. With all three transistors in this condition, there is substantially no voltage drop across resistor 78; whereas, when all three transistors are conducting, the collector current of each passes through the resistor 78, thereby causing a substantial voltage drop across this resistor. Thus, in the normal condition, a relatively high bias voltage is present on the emitter of transistor 69 because of the very low voltage drop across resistor 78 so that a weak input signal to this transistor 69 is not effective to produce an output signal.

However, once the threshold value of signal is reached, transistor 69 begins to conduct and its collector current passes through the primary winding of transformer T3 so as to provide an input signal for both transistors 70 and 71. These two transistors then also conduct so that there is then an appreciable flow of current through the common resistor 78. As a result, the bias voltage on the emitter of transistor 69 is reduced thereby resulting in a greater output signal from this transistor and a larger amplitude of signal to the two output transistors 70 and 71.

The collector currents of the transistors 70 and 71 flow through the respective upper and lower halves of the primary winding of transformer T4 and induce a voltage in the secondary winding which is applied to the output rectifier circuit. This rectifier circuit is a voltage doubling rectifier so that it is effective to provide across the output terminals a direct-current voltage that is nearly twice the peak-to-peak voltage of the carrier wave signal available at the secondary winding of transformer T4. More specifically, when the polarity of voltage across the secondary winding is such that the upper terminal is positive with respect to the lower terminal, then the capacitor 80 charges through the low forward resistance provided by rectifier 81. When the secondary voltage is of opposite polarity, capacitor 82 charges through the low forward resistance provided by the other rectifier 83. In each case, the capacitor is charged with such a polarity that its upper terminal is positive with respect to the lower terminal. Thus, the voltage across the two capacitors in series is equal to the sum of the voltages across the two individual capacitors. This voltage is then filtered by the R-C filter comprising resistors 84 and 85, capacitor 86, and resistor 87. A filtered, direct-current voltage is thus available at the output terminals, and this voltage can be used to energize a relay as shown in FIGS. 1 and 2 or may be used in any desired form. This output voltage may, for example, be supplied directly to the input of an indication transmitting system to control the indication code that is transmitted to the control office.

The transistors shown in both FIGS. 3 and 4 for the receiver and transmitter, respectively, are all of the p-n-p junction type. However, other types of transistors can equally well be used if desired.

Having described an indication transmitting system for transmitting a plurality of indications from remote locations to a central location, it should be understood that various adaptations, modifications, and alterations may be made to the specific form shown to meet the requirements of practice without in any manner departing from the spirit or scope of this invention.

What we claim is:

1. In a railway communication system, a pair of line wires connecting a receiving station to a remote location, a source of energy at said receiving station, pole changing means connected to said source of energy and said line wires at said receiving station effective to energize said line wires alternately with energy of opposite polarities, circuit means including a transmitter at said remote location operative when activated to apply energy of a distinctive frequency to said line wires, input circuit means for said transmitter including a pair of contacts, each being selectively operable to open and closed positions, said input circuit means including first rectifier circuit means and one of said contacts effective to render said transmitter active when energy of one polarity is applied to said line wires and also including second rectifier circuit means and the other of said contacts effective to render said transmitter active when energy of opposite polarity is applied to said line wires, a receiver having an input circuit connected across said line wires at said receiving location and being operative to provide output energy upon the reception of energy of said distinctive frequency over said line wires from said transmitter, a pair of electroresponsive means for said receiver, circuit means including said pair of electroresponsive means controlled by said pole changing means effective to apply the output energy of said receiver to operate one of said electroresponsive means when energy of one polarity is applied to said line wires and effective to apply the output energy of said receiver to operate the other of said electroresponsive means when energy of opposite polarity is applied to said line wires, whereby each electroresponsive means is alternately energized when a respectively associated contact at said remote location is closed.

2. A railway communication system as claimed in claim 1 wherein the energy source and pole changing means is effective to apply a D.C. voltage of opposite polarities alternately to said line wires and said transmitter and receiver are effective to transmit and receive a distinct carrier frequency over said line wires.

3. In a communication system for transmitting a plurality of distinctive indications from each of a plurality of remote locations to a single indication receiving station, a pair of line wires connecting said receiving station to said remote locations, pole changing circuit means including a source of energy at said receiving station for energizing said line wires alternately with energy of opposite polarities, a transmitter at each remote location, each being selectively rendered active solely by the energization obtained from said receiving location over said line wires to apply a distinct output signal to said line wires, each transmitter being selectively rendered active in response to one polarity of energization applied to said line wires to transmit either one of two distinctive indications to said receiving station, each said transmitter also being selectively rendered active in response to the opposite polarity of energization applied to said line wires to transmit either one of two other distinctive indications to said receiving location, a receiver at said receiving station for each transmitter, each receiver being connected to said line wires to provide an output signal when a distinct input signal is obtained from said line wires for a respective receiver, and two indication responsive means operatively connected to the output of each receiver alternately in accordance with the operation of said pole changing circuit means, said first of said indication responsive means being selectively controlled in accordance with the first two distinctive indications and the second of said indication responsive means being distinctively controlled in accordance with the second two of said distinctive indications.

4. A communication system according to claim 3 wherein each transmitter is a transistor oscillator operable to generate a distinctive output frequency and each receiver is distinctly tuned to correspond to a corresponding output frequency.

5. In a railway communication system for transmitting traffic information from a remote location to a receiving station, a pair of line wires connecting said receiving station to said remote location, a source of energy electrically connected operatively to said line wires at said receiving station effective at times to energize said line wires with energy of one polarity, a transmitter at the remote location, activating circuit means including said line wires effective when closed to activate said transmitter solely by the energy obtained over said line wires from said direct current energy source, a receiver electrically connected to said line wires at said receiving location effective to be activated upon the reception of a distinct frequency input signal obtained from said activated transmitter over said line wires, and traffic operated means at the remote location effective to close said activating circuit means to cause said distinct frequency input signal to be applied to the line wires to activate the receiver at the same time direct current energy from said source is activating said transmitter over said line wires, and means responsive to the activation of said receiver to indicate a traffic condition at the receiving location.

References Cited in the file of this patent

UNITED STATES PATENTS

| | | |
|---|---|---|
| 1,672,005 | Sorensen | June 5, 1928 |
| 2,250,214 | Ashworth | July 22, 1941 |
| 2,318,545 | Van Horn | May 4, 1943 |
| 2,396,134 | Sorensen | Mar. 5, 1946 |
| 2,576,479 | Rees | Nov. 27, 1951 |
| 2,611,025 | Jankowski | Sept. 16, 1952 |
| 2,691,075 | Schwartz | Oct. 5, 1954 |
| 2,691,077 | Koros | Oct. 5, 1954 |
| 2,695,991 | Atkinson et al. | Nov. 30, 1954 |
| 2,726,377 | Hammer | Dec. 6, 1955 |
| 2,816,218 | Rees et al. | Dec. 10, 1957 |

FOREIGN PATENTS

| | | |
|---|---|---|
| 548,496 | Germany | Apr. 13, 1932 |